United States Patent [19]
Smalanskas et al.

[11] Patent Number: 5,519,410
[45] Date of Patent: May 21, 1996

[54] VIRTUAL IMAGE DISPLAY MANAGEMENT SYSTEM WITH HEAD-UP DISPLAY

[75] Inventors: Joseph P. Smalanskas, Westchester; Dale W. Hopkins, Garden Grove; Scott T. Wood, Los Angeles, all of Calif.; Ernest S. Blazic, Ypsilanti, Mich.

[73] Assignee: Hughes Aircraft Company, Los Angeles, Calif.

[21] Appl. No.: 308,489

[22] Filed: Sep. 19, 1994

Related U.S. Application Data

[63] Continuation of Ser. No. 26,887, Mar. 5, 1993, abandoned.

[51] Int. Cl.⁶ .................................................... G09G 5/00
[52] U.S. Cl. .............................................. 345/7; 340/980
[58] Field of Search ........................... 345/7, 8; 359/630; 340/980

[56] References Cited

U.S. PATENT DOCUMENTS

| | | | |
|---|---|---|---|
| 4,600,271 | 7/1986 | Boyer et al. | 340/705 |
| 4,908,611 | 3/1990 | Iino | 340/705 |
| 5,051,735 | 9/1991 | Furukawa | 340/705 |
| 5,056,890 | 10/1991 | Iino et al. | 345/7 |
| 5,121,099 | 6/1992 | Hegg et al. | 340/705 |
| 5,148,153 | 9/1992 | Haymond | 340/711 |

*Primary Examiner*—Curtis Kuntz
*Assistant Examiner*—Vivian W. Chang
*Attorney, Agent, or Firm*—Leonard A. Alkov; W. K. Denson-Low

[57] ABSTRACT

A virtual image display management system using a head-up display that improves the ability of an operator of an automobile, or other equipment, to focus on primary functions, such as vehicle operation, while providing secondary information within the operator's primary visual field without requiring the operator to refocus. The present virtual image display management system integrates one or more secondary function displays into one reconfigurable virtual image head-up display. Several secondary functions are displayed sequentially using analog/digital symbology, icon representation, alphanumeric text or static/motion picture format. The operator may select secondary functions to be monitored, the display format, and the data acquisition intervals. A reconfigurable virtual image display processor accommodates more sophisticated sensor and communication functionality without penalizing efficiency and safety of the operator's primary functions. The present system integrates, interprets, selects and displays data derived from multiple sensors and communications systems at an optimum visual location within the operator's primary field of view. By displaying data in this fashion, an operator can vigilantly perform critical system functions while being kept well-informed of vehicle performance data, communication data and other useful functions and information.

13 Claims, 5 Drawing Sheets

VIRTUAL IMAGE DISPLAY MANAGEMENT SYSTEM WITH HEAD-UP DISPLAY

This is continuation application Ser. No. 08/026,887 filed Mar. 5, 1993, now abandoned.

BACKGROUND

The present invention relates generally to virtual image display systems, and more particularly, to a reconfigurable display management system employing a virtual image head-up display that is capable of processing and displaying information from a variety of sources.

Conventional sensor, imaging, and communication data display systems are usually hard-wired to display a specific function or set of functions, and are incapable of reconfiguration by an operator to display different sensor images and/or communications data. Conventional systems typically display images outside of an operator's visual field of focus, such as on an automobile dashboard or console mounted display, for example.

There is also a need to improve operator and equipment safety and efficiency by reducing the need to divert the operator's attention away from primary system functions, such as vehicle operation, in order to view information displays that are outside the operator's visual field and that represent secondary system functions. Additional personnel are sometimes required to manage the secondary system functions in order to prevent accidents and improve system efficiency when conventional display technology is employed. Conventional sensor and communications displays tend to clutter the operator's visual field of view and distract the operator from performing critical system functions. The distraction duration, it's effect on operator performance, and it's effect on operator safety, depends upon the complexity, number, and location of secondary function displays.

Accordingly, it is an objective of the present invention to provide a reconfigurable display management system employing a virtual image head-up display that is capable of processing and displaying information from a variety of sources.

SUMMARY OF THE INVENTION

In order to achieve the above and other objectives, the present invention provides for a reconfigurable virtual image display management system employing a head-up display that integrates and processes and displays information from a variety of sources.

The virtual image display management system comprises a display projector and an optical combiner disposed in the vehicle that is adapted to display an image projected by the display projector at a predetermined location within the field of view of an operator of the vehicle. At least one sensor or data and communication system is disposed in the vehicle that is adapted to provide data that is to be displayed to the operator. A display electronics unit is coupled to the at least one sensor or data and communication system and to the display projector that is adapted to provide data to the projector for display thereby to the operator.

The system may also include a vehicle performance monitoring transducer coupled to the display electronics unit that provides data regarding vehicle performance for display to the operator. The system may also include a transceiver system and a modem coupled between the transceiver system and the display electronics unit. The system may also include an external video source coupled to a video input of the display unit and selection means for alternatively selecting data derived from the video source and the display electronics unit for display to the operator.

The system may also comprise an optional keyboard input device coupled to the display electronics unit for permitting data entry thereto. The system may also include a plurality of sensors and data and communication systems disposed in the vehicle, each of which is coupled to the display electronics unit, and wherein the display electronics unit is adapted to simultaneously display data from multiple ones of the plurality of sensors and data and communication systems.

The display electronics unit comprises a plurality of data adapters that are adapted to interface to the plurality of sensors and data and communication systems, a processor adapted to process data from the plurality of sensors, data systems, and communication systems, and a mode selection switch coupled between the plurality of data adapters and the processor that is adapted to selectively couple data from a selected one of the plurality of sensors and data and communication systems to the processor. The optical combiner may comprise an aspheric combiner, a spherical combiner, or may employ a windshield of the vehicle. The spheric or aspheric combiner may be comprised of a visor.

The present system improves the ability of an operator of a vehicle, or other equipment, to focus on primary functions while providing secondary information within the operator's primary visual field without requiring the operator to refocus. The present virtual image display management system integrates one or more data sources into one reconfigurable virtual image head-up display system. Secondary functions are displayed using analog/digital symbology, icon representation, or alphanumeric text or static/motion picture format. The operator may select secondary functions to be monitored and displayed, the display format, and the data acquisition intervals.

The present invention integrates, interprets, selects and displays data derived from multiple sensors and communications systems at an optimum visual location within the operator's primary field of view. By displaying data in this fashion, the operator can vigilantly perform critical system functions while being kept well-informed of process feedback, communication data and other useful functions and information. The present invention thus provides the operator with the advantage of total situation awareness (in terms of the vehicle or environment in which the operator is present) by allowing him/her to perform in a multi-functional role.

The present virtual image display management system improves operator and equipment safety and efficiency by reducing the need to divert the operator's attention away from primary system functions in order to view secondary function displays that are outside the operator's visual field. If equipment functions require vigilant operator viewing in many directions, the virtual image display management system of the present invention may be adapted to use a virtual image display visor, in lieu of a fixed position virtual image head-up display, such as is provide by the spheric or aspheric combiner provided in the form of a visor.

The present virtual image display management system enhances state-of-the-art sensor imaging and communication data displays, and also enables enhanced and additional secondary functions to be incorporated into equipment upgrades and new equipment designs. The reconfigurable virtual image display processor accommodates more sophisticated sensor and communication functionality without penalizing efficiency and safety of the operator's primary functions. In fact, real-time feedback from sensors, communication links and other secondary equipment functions is made possible by the present virtual image display management system, which substantially improves safety and efficiency of the primary equipment functions.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
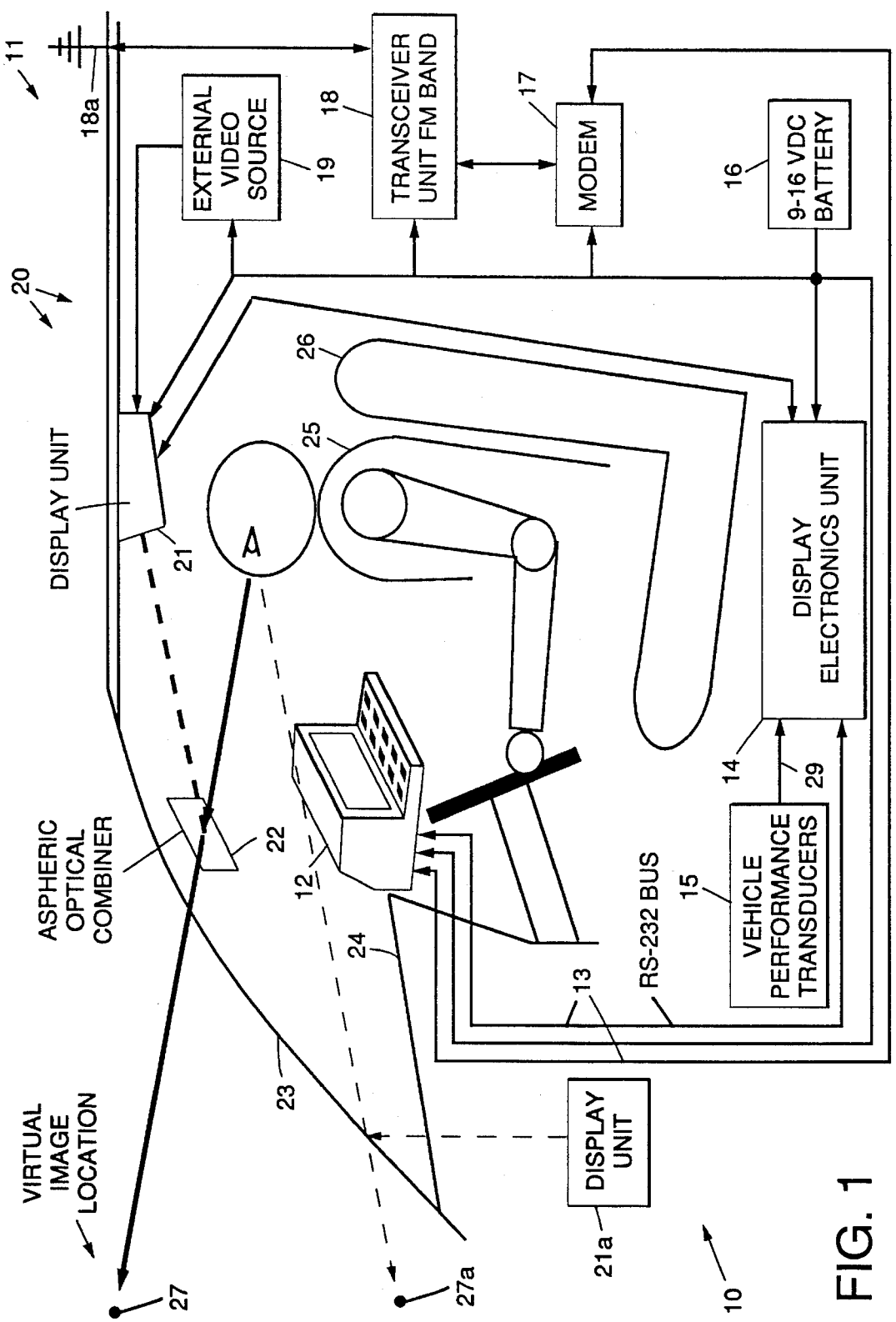
FIG. 1 shows an automobile system implementation of a virtual image display management system in accordance with the principles of the present invention.

Referring to the drawing figures, FIG. 1 shows an automobile system implementation representing one specific operational embodiment of a virtual image display management system 10 in accordance with the principles of the present invention. The embodiment shown in FIG. 1 has been reduced to practice in order to prove out the principles of the present invention. The embodiment shown in FIG. 1 illustrates a portion of a vehicle 11 having a front windshield 23, and an operator 25 is sitting in a seat 26 in front of a conventional dashboard 24. The present system 10 is adapted for use in the vehicle 11 and includes a head-up-display system 20 comprising a display unit 21 that is adapted to project an image at an optical combiner 22, which combination of elements produces a virtual image 27 at a predefined distance in front of the windshield 23. The location of the virtual image 27 is chosen to be at a comfortable viewing distance for the operator 25.

The system 10 is comprised of a display electronics unit 14 which is coupled to vehicle performance transducers 15 that are disposed on the vehicle by way of a plurality of analog and logic channels 29. The display electronic unit 14 is also coupled to the display unit 21, and to a mobile data terminal 12 by way of an RS-232 bus 13. The mobile data terminal 12 is also coupled to a modem 17 by way of the RS-232 bus 13. The modem 17 is in turn coupled to an FM band transceiver unit 18 having an RF antenna 18a mounted to the roof of the vehicle 11. A video source 19 is coupled to the display unit 21. A power supply or battery 16 is coupled to each of the electronic components in the system 10 in a conventional manner.

The display electronics unit 14 incorporates various interfaces and a reconfigurable processor that provides for control over the display unit 21 and manages the various data input sources (subsystems) that make up the system 10 to control the data that is displayed to the operator 25. The display electronics unit 14 may also comprise voice recognition device 14a may be coupled to the processor of the display electronics unit 14, that is adapted to selectively couple data from a selected one of the plurality of sensors and data and communication systems to the processor in response to predetermined voice commands issued by the operator 25. The display electronics unit 14 is coupled to each of the subsystems to which the system 10 interfaces and from which the system 10 is to display data. Such connections are made using conventional data ports (RS-232 or IEEE 488) and analog and digital communications channels as will be described in more detail below. Such connections and the communication between subsystems is accomplished in a manner that is well-known in the art.

The display unit 21 may incorporate head-up display technology such as is disclosed in U.S. Pat. No. 4,973,139, entitled "Automotive Head-Up Display", granted Nov. 27, 1990, and which is assigned to the assignee of the present invention. This type of head-up display technology is generally well-known to those skilled in the art and will not be described in detail herein. The mobile data terminal 12 may be one that is manufactured by Motorola and that is in general use in the law enforcement industry. The mobile data terminal 12 is generally well known to those skilled in the art relating to the present invention.

Figure 2:
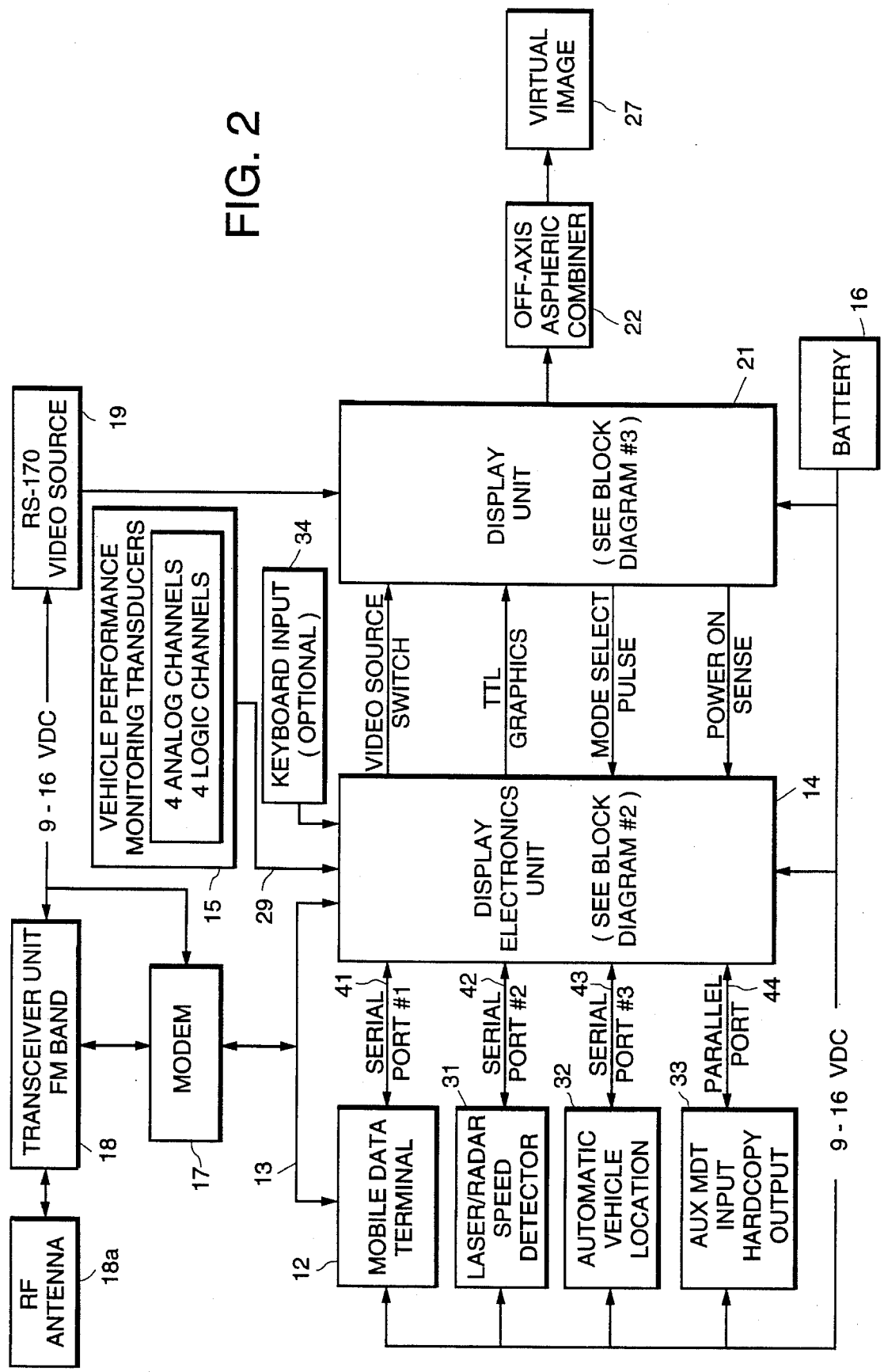
FIG. 2 shows a block diagram of the virtual image display management system of FIG. 1.

The design and operation of the present system 10 outlined above will be better understood with reference to FIG. 2, which illustrates a detailed block diagram of the virtual image display management system 10 of FIG. 1. FIG. 2 shows a broader, more general implementation of the system 10 of the present invention which integrates a plurality of different subsystems and provides for management of all subsystems and display of the data provided by each by way of the display unit 21.

In the system 10 of FIG. 2, the display electronics unit 14 is coupled to the mobile data terminal 12, a laser or radar speed detector 31, such as is employed in the law enforcement industry, an automatic vehicle location system 32, such as may be employed to implement a mapping system, and an auxiliary terminal 33 that is coupled to the mobile data terminal 12 and which provides for hardcopy output therefrom. The display electronics unit 14 is coupled to the mobile data terminal 12 by means of a first bidirectional serial port 41, to the laser or radar speed detector 31 by means of a second bidirectional serial port 42, to the automatic vehicle location system 32 by means of a third bidirectional serial port 42, and to the mobile data terminal 33 by means of a bidirectional parallel port 44. a printer may also be connected to any of the serial ports 41–43.

The display electronics unit 14 provides a video source switch signal and TTL graphics signals to the display unit 21, while the display unit 21 provides a mode select pulse derived from a mode select switch 76 (FIG. 4) and power-on sense signal to the display electronics unit 14. An optional keyboard 34 may be provided that is coupled to the display electronics unit 14. The details of the display electronics unit 14 and display unit 21 are provided below with reference to FIGS. 3 and 4, respectively.

Figure 3A:
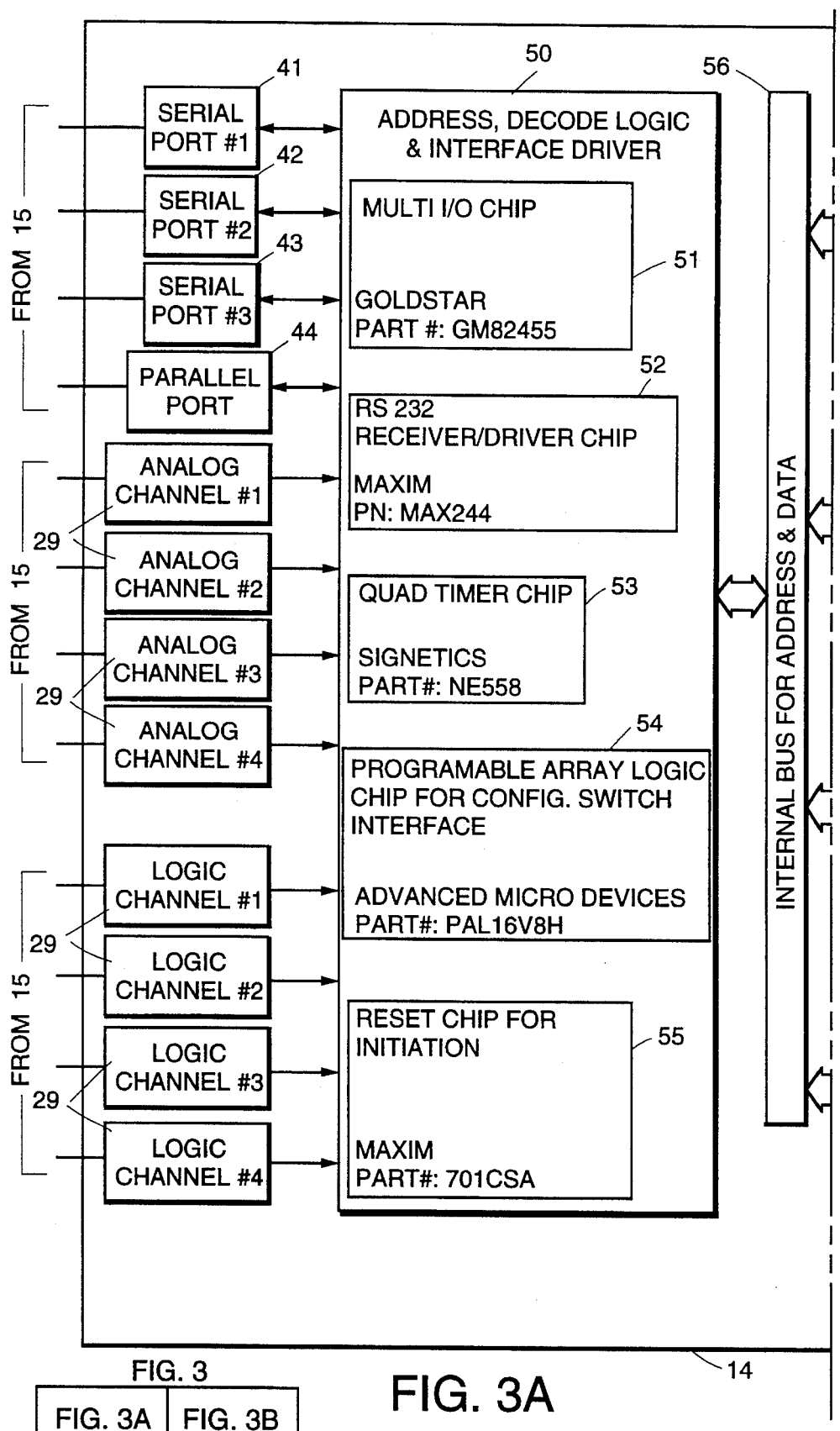
FIG. 3 shows a block diagram of the display electronics unit of the virtual image display management system of FIG. 1.
Figure 3B:
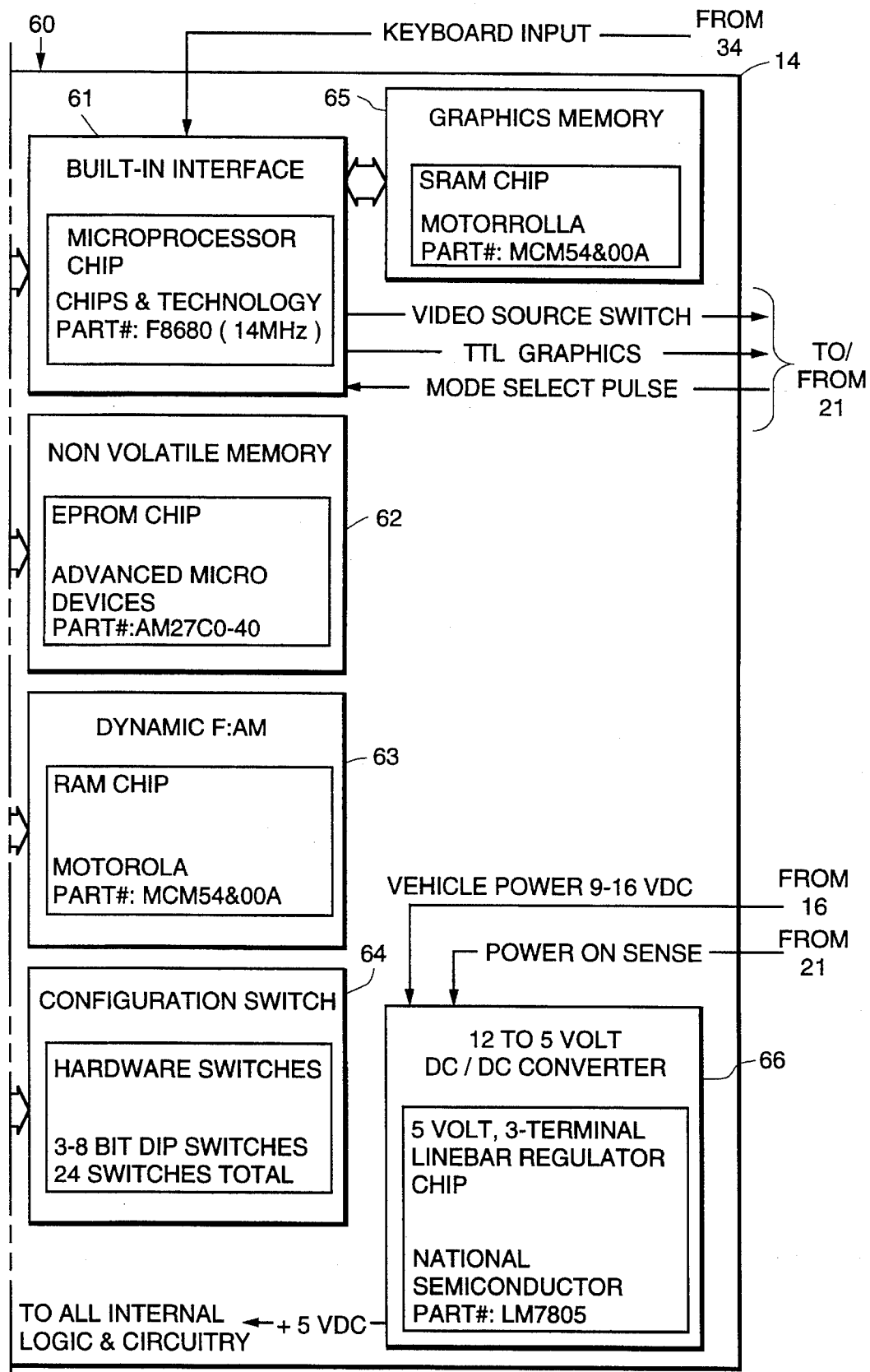

FIG. 3 shows a detailed block diagram of the display electronics unit 14 of the virtual image display management system 10 of FIG. 1. The display electronics unit 14 comprises the plurality of input and output ports including the three serial ports 41, 42, 43 and the parallel port 44, and the analog and logic channels 29 that are coupled to the vehicle performance monitoring transducers 15. Each of the ports 41–44 and channels 29 are coupled to an address, decode logic and interface driver 50 which is adapted to process the data received therefrom.

The address, decode logic and interface driver 50 is comprised of an input/output integrated circuit 51, such as a model GM82455 I/O chip manufactured by Goldstar, for example, and an RS-232 receiver driver integrated circuit 52, such as a model MAX244 RS-232 receiver driver manufactured by Maxim, for example. The address, decode logic and interface driver 50 also comprises a quad timer chip 53, such as a model NE558 quad timer manufactured by Signetics, for example, a programmable array logic chip 54 that provides for configurable switch interface, such as a model PAL16V8H programmable array logic chip manufactured by Advanced Micro Devices, for example, and a reset chip 55 that provides for initiation of the system 10 such as a model 701CSA reset chip manufactured by Maxim, for example.

The address, decode logic and interface driver 50 is coupled by way of an internal bus 56 to internal interface circuitry 60 comprising a plurality of integrated circuit and discrete hardware devices. The interface circuitry 60 comprises a microprocessor chip 61, such as a model F8680 14 MHz microprocessor manufactured by Chips and Technology, for example, a nonvolatile memory 62, such as a model AM27C040 EPROM chip manufactured by Advanced Micro Devices, for example, a dynamic RAM 63, such as a model MCM54800A RAM chip manufactured by Advanced Micro Devices, for example, and a configuration switch 64 comprising a plurality of hardware switches, such as are provided by three 8-bit DIP switches, for example.

The configuration switches provide a means for configuring the data ports 41–44 so that the proper data format is processed by the ports 41–44, and define which ports 41–44 the mode select switch 76 (FIG. 4) cycles through when toggled by the operator 25. Software is also provided in the EPROM nonvolatile memory 62 which may be changed to provide for reconfigurability of the system 10. The programmability of the nonvolatile memory 62 is routine for those skilled in the art and will not be discussed further herein.

The microprocessor chip 61 is coupled to a graphics memory 65 provided by an SRAM chip, such as a model MCM54800A SRAM chip manufactured by Advanced Micro Devices, for example. A 12 volt to 5 volt DC to DC converter 66 is also provided which has outputs coupled to the internal logic circuitry of the display electronics unit 14 described above. The DC to DC converter 66 may be comprised of a model LM7805 5 volt, 3 terminal linear regulator chip manufactured by National Semiconductor, for example.

Interconnection of the components comprising the display electronics unit 14 is considered routine for those skilled in the art and may be easily performed using application notes and design guides available from the various manufacturers of the devices. Accordingly, further detail of the interconnection of these devices will not be provided herein.

Figure 4:
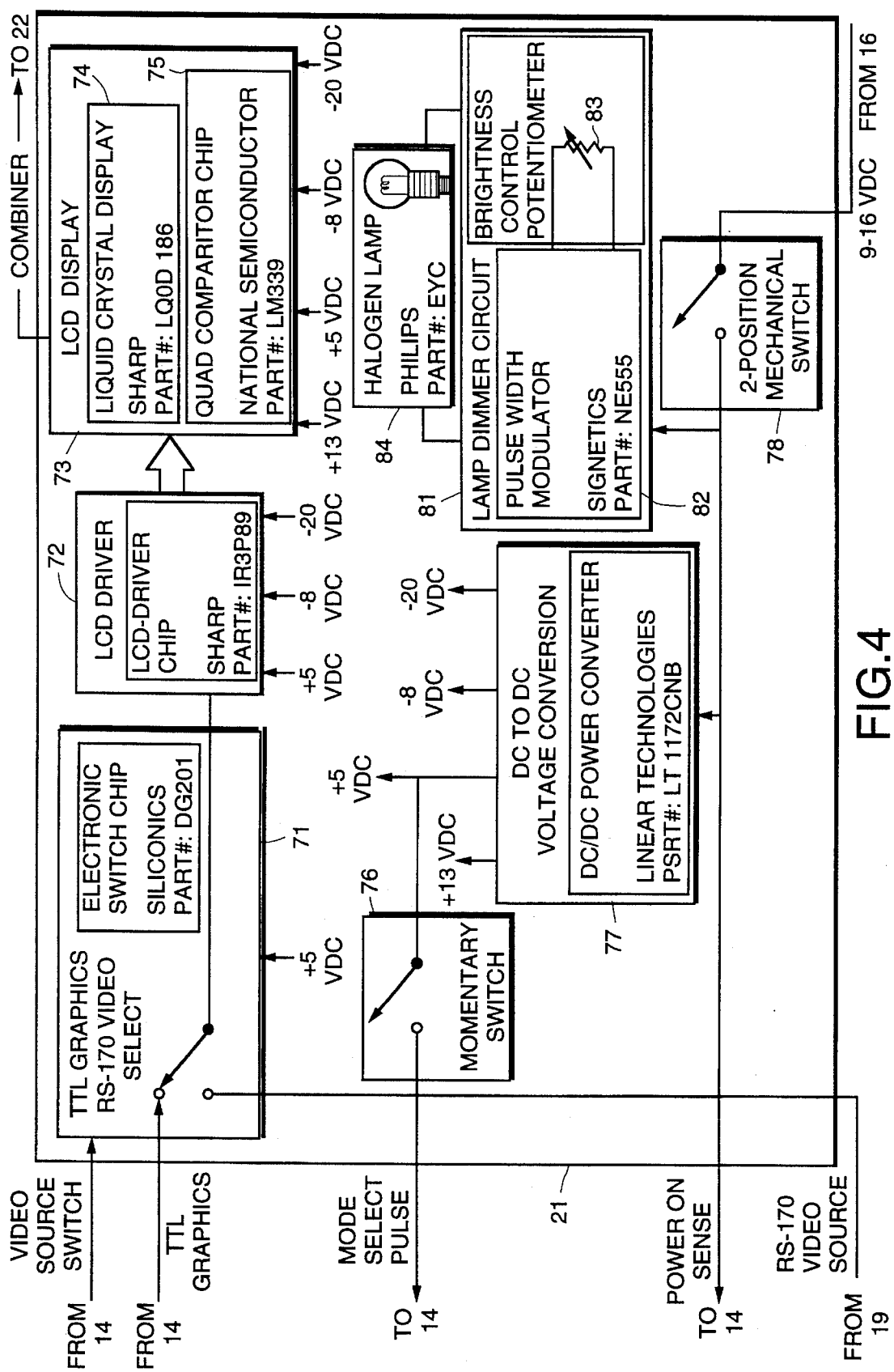
FIG. 4 shows a block diagram of the display unit of the virtual image display management system of FIG. 1.

FIG. 4 shows a detailed block diagram of the display unit 21 of the virtual image display management system 10 of FIG. 1. The display unit 21 is comprised of a TTL graphic video select switch 71, which may be a model DG201 electronic switch chip manufactured by Siliconics, for example. The video select switch 71 is coupled to an LCD driver 72, which may be comprised of a model IR3P89 liquid crystal driver chip manufactured by Sharp, for example. The LCD driver 72 is coupled to an LCD display unit 73 comprising a liquid crystal display 74, such as a model LQ0D186 liquid crystal display manufactured by Sharp, for example, and a quad comparator chip 75, such as a model LM339 quad comparator chip manufactured by National Semiconductor, for example.

A momentary-type mode select switch 76 is coupled to a DC to DC voltage converter 77, such as a model LT1172CNB converter manufactured by Linear Technologies, for example. The mode select switch 76 provides the mode select pulse that causes the display electronics unit 14 to sequence through its input ports 41–44 and/or analog/logic channels 29 which in turn selects a particular input source for display. A two position switch 78 is coupled to a lamp dimmer circuit 81 comprising a pulse width modulator, such as a model NE555 pulse width modulator manufactured by Signetics, for example, and a brightness control potentiometer 83. The second two position switch 78 provides power to the display unit 21.

The video source 19 is coupled to one pole of the TTL graphics video select switch 71 while the TTL graphics signal line from the display electronics unit 14 is coupled to the second pole of the video select switch 71. The video source switch signal is operative to select between the TTL graphics signal and the video source. The video source is another sequentially selected channel, selected by the mode select switch 76, in that the video select video select switch 71 is triggered by the mode select switch 76. The mechanical switch 78 is coupled between the battery 16 and the lamp dimmer circuit 81 and provides the power on sense signal input to the display electronics unit 14. Optical output from the LCD display 73 is applied to the combiner 22.

Interconnection of the components comprising the display unit 21 is also considered routine for those skilled in the an and may be easily performed using application notes and design guides available from the various manufacturers of the devices. Accordingly, further detail of the interconnection of these devices will not be provided.

Each of the sensors, and data and communication systems shown in FIGS. 1 and 2 are controllable in the system 10 of the present invention to selectably project and display data available from these sources to the operator 25. By way of example, these sensors, and data and communication systems may include speed detection sensors such as radars, vehicle identification sensors, collision avoidance sensors, vehicle performance sensors for monitoring the engine and brakes, dispatching links, mapping and location links, report generation links, communications links, infrared and low light level video surveillance sensors, a mobile video documentation link, and a mobile video link. Several of these subsystems are identified and described with reference to FIGS. 1 and 2 above. The balance of these subsystems may be routinely integrated into the present system using the available data ports 41–44 or channels 29 in a conventional manner.

Each of the above-cited sensors, and data and communication systems are coupled to the display electronics unit 14 by way of either RS-232 serial data ports 41–43, parallel data port 44, or logic/analog adapters 29, as is indicated in FIG. 3. The design, construction, interconnection and use of these ports 41, 42, 43 and adaptors 29 is well known and is considered routine for those skilled in the art, and will not be described in detail herein.

Embodiments of the virtual image display management system 10 and incorporating the head-up display system 20 (display unit 21 and combiner 22) have been developed and reduced to practice for use in automobiles, law enforcement ground vehicles, farm tractors and railroad locomotives. The virtual image display management system 10 developed for each of these applications utilizes the head-up display system 20 to display sensor and/or communications data within the primary or preferred field of view of the operator 25. The head-up display system 20 in reduced-to-practice embodiments uses a backlighted matrix addressable liquid crystal display (LCD) imaging source that comprises the display unit 21.

One embodiment of the head-up display system 20 employs a spherically shaped combiner 22. Alternatively, an aspheric combiner 22 (disclosed with reference to FIG. 1) may also be employed in lieu of the windshield 23. The configuration using the aspheric or spheric combiner 22 has a more precise optical alignment to the imaging source (display unit 21) and has an improved optical surface finish compared to the automotive windshield 23. These components each contribute to provide better image resolution. The location of the combiner 22 eliminates the windshield 23 as an element in the image display system 10, thereby allowing installation of the present system 10 into a wider range of vehicles 11. The combiner 22 for use in the vehicle 11 may comprise an aspheric visor or a spherical visor or a spherical visor.

In a second embodiment of the display system 20 may employ the windshield 23 as the combiner element. In the second embodiment, illustrated in FIG. 1, the display unit 21a is disposed under or on top of the dashboard 24 and projects images upward onto the windshield 23. The projected image 27a is formed in front of the windshield 23 at a location below the line of sight of the operator 25.

Cathode ray tubes (CRT) and vacuum fluorescent displays (VFD) are other virtual image display units 21 that are currently available and may be adapted for use in the present system 10. However, a backlighted matrix addressable LCD source (display unit 21) was used in reduced-to-practice embodiments, in lieu of a VFD, for example, because of its ability to be easily interfaced to and controlled by the display electronics 14.

In operation, in the law enforcement application, using a vehicle configured as shown in FIG. 1, the system 10 displayed a radar display and vehicle speed. In the private automobile application the system 10 displayed a fuel gage, vehicle speed, oil pressure and temperature. However, the virtual image display management system 10 has broad application for large numbers of commercial and military systems. Mobile and stationary equipment requiting an operator monitored or controlled interface may benefit from the present system 10. This includes all human controlled vehicles that travel by air, land, or sea.

For example, the ways in which a virtual image display management system 10 improves efficiency and safety of law enforcement ground vehicles are as follows. The operator 25 of the vehicle 11 is primarily required to maintain control over that vehicle 11 at all times to ensure occupant safety and the safety of others. Speed limit enforcement, stolen vehicle recovery, high speed vehicle pursuit, call response, data terminal operation and radio operation are additional functions performed by the operator 25 of the law enforcement vehicle 11. The burden of these additional responsibilities typically diminish the operator's capacity for safe vehicle operation. However, with the virtual image display management system 10 installed in the law enforcement vehicle 11 that displays data from one or more of the sensor, imaging and communication systems described herein, the requirement for operator-assisted display of such data is minimized, thus improving efficiency and safety.

The present system 10 may be adapted to interfaces to currently available radar and communications systems. The present system 10 may be adapted to display a description of situations requiring law enforcement intervention. Street address, direction, and estimated time of arrival to a call location may be displayed by the system 10. Vehicle speed, heading and engine/fluid level instrumentation may be displayed by the present system 10. A radar system that records a speeding vehicle's velocity may be incorporated into and managed by the system 10 and the data therefrom may be displayed using the head-up display system 20. A collision avoidance radar system used during high speed pursuit may be interfaced to the present system 10, and data regarding locations of other vehicles, including their speed and direction, along with warning information may be displayed to the vehicle operator. A satellite communications interface may be provided with the present system 10 for accessing criminal and vehicle record databases. A fingerprinting sensor and data printer may also be provided that interfaces with the satellite communications system described above. Fingerprint data and database data may be displayed and printed by the system 10 using the ports 41–44 and analog and logic channels 29.

Other industries may utilize the present virtual image display management system 10 including construction, railroad, truck, auto, public ground/air transportation, delivery and repair services, emergency services, merchant marine, manufacturing processing, mineral extraction, and agriculture, for example.

Thus there has been described a reconfigurable display management system employing a virtual image head-up display that is capable of processing and displaying information from a variety of sources. It is to be understood that the above-described embodiments are merely illustrative of some of the many specific embodiments which represent applications of the principles of the present invention. Clearly, numerous and other arrangements can be readily devised by those skilled in the art without departing from the scope of the invention.

What is claimed is:

1. A virtual image display management system for use in a vehicle, said system comprising:

a display projector disposed in the vehicle;

an optical combiner disposed on the vehicle for displaying a virtual image projected by the display projector at a predetermined location within the field of view of an operator of the vehicle;

a monitoring system disposed in the vehicle for sensing data external to the vehicle that is to be displayed to the operator;

a data and communication system disposed in the vehicle for providing data that is to be displayed to the operator;

a display electronics unit coupled to the monitoring system, data and communication system and to the display projector for providing data to the projector for display thereby to the operator;

an external video source coupled to a video input of the display unit; and selection means disposed in the display unit for alternatively selecting data derived from the video source and the display electronics unit for display to the operator.

2. The system of claim 1 wherein further comprising;

a vehicle performance monitoring transducer coupled to the display electronics unit.

3. The system of claim 1 which further comprises:

a transceiver system; and a modem coupled between the transceiver system and the display electronics unit.

4. The system of claim 1 which further comprises a keyboard input device coupled to the display electronics unit for permitting data entry thereto.

5. The system of claim 1 which comprises:
- a plurality of monitoring systems and data and communication systems disposed in the vehicle, each of which is coupled to the display electronics unit, and wherein the display electronics unit simultaneously displays data from multiple ones of the plurality of monitoring systems and data and communication systems.

6. The system of claim 1 wherein the display electronics unit comprises:
- a plurality of data adapters for interfacing interface to the plurality of monitoring systems and data and communication systems;
- a processor for processing data from the plurality of monitoring systems, data systems, and communication systems; and
- a mode selection switch coupled between the plurality of data adapters and the processor for selectively coupling data from a selected one of the plurality of monitoring systems and data and communication systems to the processor.

7. The system of claim 1 wherein the optical combiner comprises an aspheric combiner.

8. The system of claim 1 wherein the optical combiner comprises a spherical combiner.

9. The system of claim 1 wherein the optical combiner comprises an aspheric visor.

10. The system of claim 1 wherein the optical combiner comprises a spherical visor.

11. The system of claim 1 wherein the display electronics unit comprises:
- a plurality of data adapter for interfacing to the plurality of monitoring systems and data and communication systems;
- a processor for processing data from the plurality of monitoring systems, data systems, and communication systems; and
- a voice recognition device coupled to the processor for selectively coupling data from a selected one of the plurality of monitoring systems and data and communication systems to the processor in response to predetermined voice commands issued by the operator.

12. The system of claim 1 wherein the display projector is disposed within a dashboard of the vehicle and wherein the optical combiner is comprised of a windshield of the vehicle.

13. The system of claim 1 wherein the display projector is disposed on top of a dashboard of the vehicle and wherein the optical combiner is comprised of a windshield of the vehicle.

* * * * *